United States Patent
Delaney et al.

(10) Patent No.: US 11,444,981 B1
(45) Date of Patent: Sep. 13, 2022

(54) ZERO NETWORK-PROFILE CRYPTOGRAPHICALLY SECURE NETWORK PORT ACCESS

(71) Applicant: Berryville Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US)

(73) Assignee: Cyber IP Holdings, LLC, Herndon, VA (US)

( * ) Notice: Subject to any disclaimer, the term of this patent is extended or adjusted under 35 U.S.C. 154(b) by 130 days.

(21) Appl. No.: 16/874,767

(22) Filed: May 15, 2020

Related U.S. Application Data (60) Provisional application No. 62/857,527, filed on Jun. 5, 2019.

(51) Int. Cl.
*H04L 9/40* (2022.01)
*H04L 9/06* (2006.01)

(52) U.S. Cl.
CPC ............ *H04L 63/20* (2013.01); *H04L 9/0643* (2013.01); *H04L 63/108* (2013.01)

(58) Field of Classification Search
CPC ...... H04L 63/20; H04L 9/0643; H04L 63/108
USPC .......................................................... 713/162
See application file for complete search history.

(56) References Cited

U.S. PATENT DOCUMENTS

2016/0142274 A1* 5/2016 Mulkey ................. H04L 43/087 709/224
2019/0306190 A1* 10/2019 Suraparaju ......... G06Q 20/0655

\* cited by examiner

*Primary Examiner* — Anthony D Brown
(74) *Attorney, Agent, or Firm* — Jones Day (57) ABSTRACT

Systems and methods for protecting access to network ports on a server are provided herein. A system comprises a server configured to receive a data packet comprising a cryptoken corresponding to a network port address. The server is further configured to generate a plurality of cryptokens based on a plurality of timecodes, a network port configuration, and the destination address. The server generates a plurality of hashes based on the plurality of cryptokens. The server generates, based on a comparison of each of the plurality of cryptokens to the cryptoken, a rule to allow inbound connections to a first network port corresponding to the network port address.

20 Claims, 6 Drawing Sheets

ZERO NETWORK-PROFILE CRYPTOGRAPHICALLY SECURE NETWORK PORT ACCESS

CROSS-REFERENCE TO RELATED APPLICATIONS

This application claims priority to U.S. Provisional Application No. 62/857,527, filed Jun. 5, 2019, which is incorporated herein by reference in its entirety.

TECHNICAL FIELD

The technology described herein relates to secure communications and more particularly to secure communications between a client and a server.

BACKGROUND

Internet-accessible machines are constantly under attack from various sources across the internet. A typical attack may comprise a port scan of a particular internet protocol (IP) address or range of IP addresses. A port scan yields at least two results. First, it allows the attacker to see what particular network ports are open on a given machine or machines. Second, it allows the attacker to compare the "signature" of multiple machines (the notional fingerprint of machines that are deployed with similar configurations) by discovering seemingly unrelated hosts that have similar or identical sets of open network ports and are therefore running a similar suite of software.

The first result can be used to determine which methods to use to attack a specific host in order to compromise it. The second result can be used to initiate a meta-attack by associating disparate hosts with one another, either as a way of establishing a forensic link between them, or as a way of predicting which hosts will be vulnerable to particular attacks based on their similarity to other hosts that have already fallen to an attack, or both.

In order to ensure that a host is both secure against attack and impervious to port scan-based fingerprinting, it is ideal for the host to listen on no network ports at all, i.e., to silently ignore any and all requests for connection by all other hosts on the internet. However, a host configured in this way cannot be accessed by any other machine, and with rare exception, a host that cannot be reached across the internet is not useful.

One common scheme for circumventing this limitation is "port knocking," wherein a software service running on a target host listens for connectionless User Datagram Protocol (UDP) data packets to arrive on a number of network ports in a particular sequence. When the correct ports are "knocked on" in the correct order within a sufficiently small time window, the software service on the target host can "open" one or more ports so that other hosts can connect to them. Upon receiving a different "knock" pattern, the software service can close the port so that hosts can no longer connect to the target host.

One weakness of port knocking is that there are only 65535 UDP ports available for such knocking. In other words, each port in the sequence only adds 16 bits of entropic difficulty to the notional "password" that the port knock implies. For example, a four-port "knock" sequence is roughly equivalent to a nine-character password. Sufficient compute power exists to brute-force attempts to bypass the knocking. While increasing the number of ports used in the knock sequence can improve security, a longer knock sequence sent in the inherently unreliable UDP protocol could mean potential inaccessibility of the target host.

SUMMARY

A system for protecting access to network ports on a server is provided. The system comprises a server configured to receive a data packet comprising a cryptoken corresponding to a network port address. The server is further configured to generate a plurality of cryptokens based on a plurality of timecodes, a network port configuration, and the destination address. The server generates a plurality of hashes based on the plurality of cryptokens. The server generates, based on a comparison of each of the plurality of cryptokens to the cryptoken, a rule to allow inbound connections to a first network port corresponding to the network port address.

As another example, a method for protecting access to network ports on a server is provided. In the method, the server receives a data packet comprising a cryptoken corresponding to a network port address. The server generates a plurality of cryptokens based on a plurality of timecodes, a network port configuration, and the destination address. The server generates a plurality of hashes based on the plurality of cryptokens. The server generates, based on a comparison of each of the plurality of cryptokens to the cryptoken, a rule to allow inbound connections to a first network port corresponding to the network port address.

As a further example, a non-transitory computer readable storage medium storing one or more programs configured to be executed by one or more data processors, the one or more programs comprising instructions for protecting access to network ports on a server is provided. The instructions comprise receiving, by the server, a data packet comprising a cryptoken corresponding to a network port address. The server generates a plurality of cryptokens based on a plurality of timecodes, a network port configuration, and the destination address. The server generates a plurality of hashes based on the plurality of cryptokens. The server generates, based on a comparison of each of the plurality of cryptokens to the cryptoken, a rule to allow inbound connections to a first network port corresponding to the network port address.

DETAILED DESCRIPTION

Instead of a port-sequence knock, the systems and methods described herein make use of shared secrets, time-based tokens, and cryptographically-strong hashing algorithms to create tokens that can only be used for a predetermined time period. The tokens may be used by a specific host, to tell a protected target host to allow access to only the specific host that sent the token. The systems and methods described herein use network technology to hide the fact that the tokens are being received by the protected target host.

A valid token may only be generated by an authorized host, i.e., the specific host, only be used by that same host, and only be used for a predetermined time window before it is no longer valid. Because of the shared secret component of the token, no host other than the specific host that has the shared secret can construct a token that will be accepted by the protected target host. Additionally, because the token comprises the IP address of the specific host, no host other than the specific host one can construct a token that will be accepted by the protected target host. In other words, even if a third party were to intercept the token en route and resend it from its own IP address, the IP address of the third party sender and the hashed address of the legitimate sender, i.e., the specific host, would not match. Finally, because of a timecode component of the token, the token is only valid for the predetermined time window.

Figure 1:
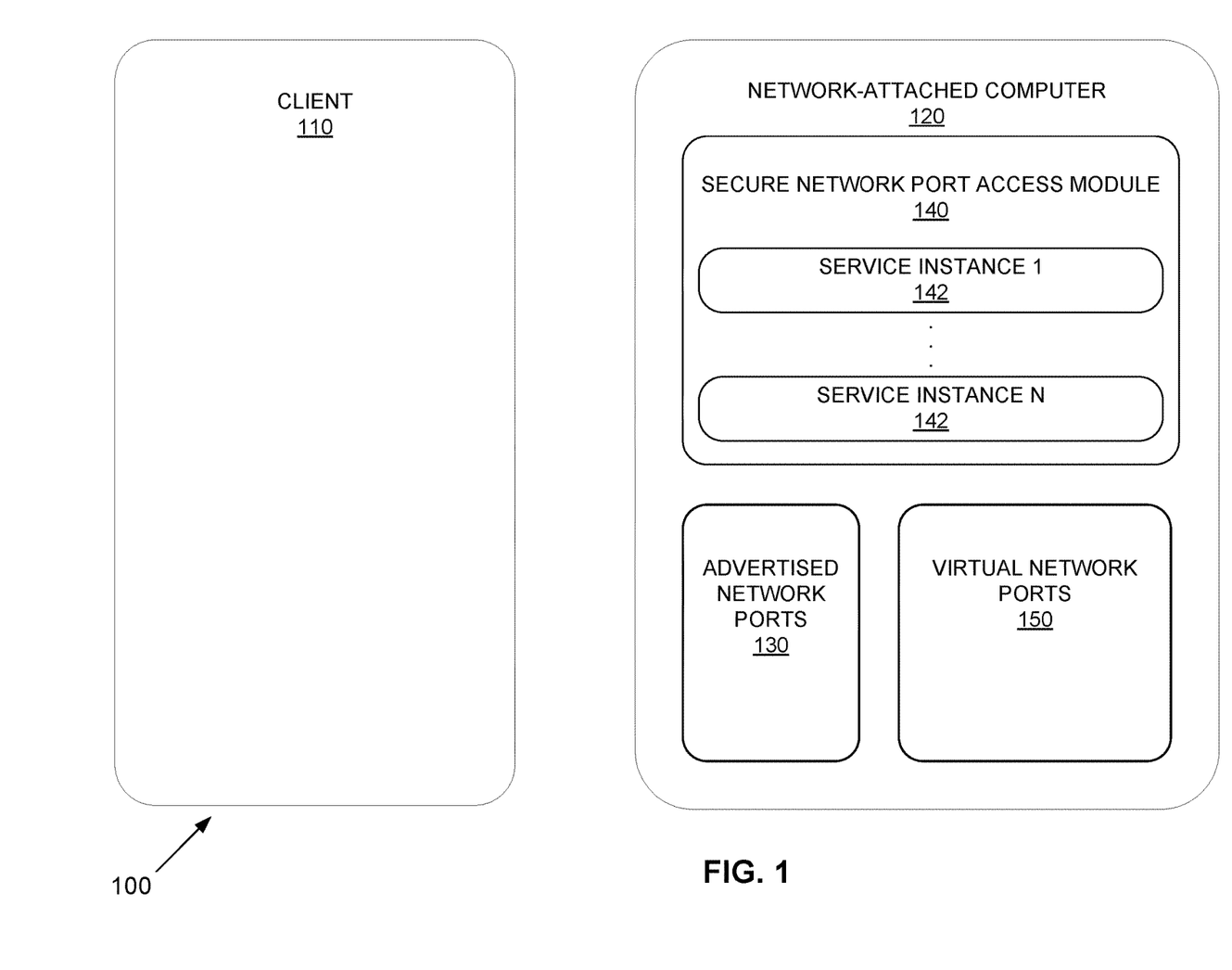
FIG. 1 depicts a system that provides zero-network profile cryptographically-secure network port access from a client to a network-attached computer.

FIG. 1 depicts a system 100 that provides zero-network profile cryptographically-secure network port access from a client to a network-attached computer. The system 100 comprises a client 110 and a network-attached computer 120, i.e., a protected target host. The client 110 can be invoked prior to connecting to the protected target host by any host wishing to connect to the network-attached computer 120. The network-attached computer 120 comprises advertised network ports 130, a secure network port access module 140, and virtual network ports 150. The secure network port access module 140 acts as an intermediary between the advertised network ports 130 and the virtual network ports 150. The secure network port access module 140 comprises one or more instances of a service 142 that capture and analyze UDP packets as they arrive on one of the advertised network ports 130, without ever acknowledging their receipt.

Each service instance running on the network-attached computer 120 is configured with the following information:
- a UDP port number to observe in order to detect cryptographic tokens (cryptokens);
- one or more network ports to be opened when a correct cryptoken is received; and
- shared-secret keys for use in building cryptokens.

The one or more services instances can run simultaneously, and each instance can be configured to control one or more TCP and/or UDP ports with a single cryptoken.

Because Transmission Control Protocol (TCP) is connection-oriented, the network-attached computer 120 can be configured to allow established connections to proceed on a network port even if the network port was closed after the connection was established. As a result, when a service instance is configured to control a TCP port, and it receives a correct cryptoken, it will open the TCP port for a predetermined period of time, e.g. ten seconds, and then close it again. The window of time that the TCP port was open is sufficient for a requesting host to establish a connection with the TCP port. When the port automatically closes at the end of the predetermined period of time, the established connection will persist. If the requesting host requires a new connection to the TCP port, it must create and send a new cryptoken to request the TCP port be opened again. Because the User Datagram protocol is connectionless, the strategy used for TCP ports cannot be used for UDP ports. Instead, when a service instance receives a correct "open" cryptoken, it can open the corresponding UDP port and leave it open for that host until it receives a correct "close" cryptoken from the same host that sent the "open" cryptoken.

For both TCP and UDP ports, the port is opened only for the host that sent the correct cryptoken; all other hosts on the internet will assess the port (and the other ports in the virtual network ports 150) as nonresponsive. Even if the network-attached computer 120 is under active port-scanning analysis from third parties, it is possible for the network-attached computer 120 protected by the one or more service instances 142 to provide services to authorized client machines, e.g., the client 110, without ever revealing that it is allowing connections from certain hosts.

Figure 2:
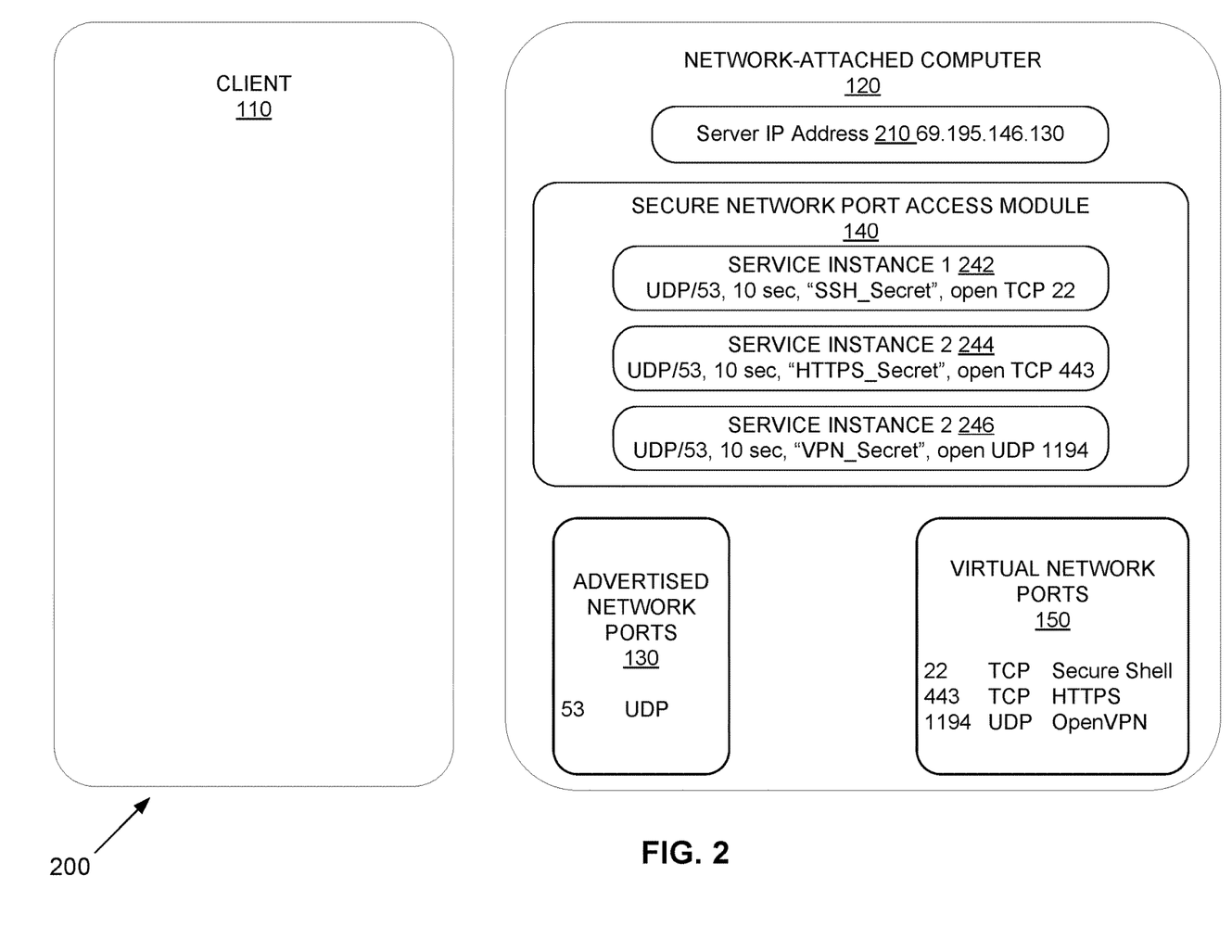
FIG. 2 depicts a configured client and a configured server in a system that provides zero-network profile cryptographically-secure network port access from a client to a server.

FIG. 2 depicts a configured client and a configured server in a system that provides zero-network profile cryptographically-secure network port access from a client to a network-attached computer. The network-attached computer 120 with an IP address 210 of 69.195.146.130 is to be protected using three service instances 242, 244, and 246 in the secure network port access module 140. The three service instances 242, 244, and 246 need to allow access to the following ports/protocols in a list of virtual network ports 150:
- 22/TCP (Secure Shell, connection-oriented)
- 443/TCP (HTTPS, connection-oriented)
- 1194/UDP (OpenVPN, connectionless)

A system administrator configures three service instances 242, 244, and 246 as follows:
- 242: observe traffic on UDP/53, 10-second tolerance, shared secret "SSH_Secret", open TCP 22
- 244: observe traffic on UDP/53, 10-second tolerance, shared secret "HTTPS_Secret", open TCP 443
- 246: observe traffic on UDP/53, 10-second tolerance, shared secret "VPN_Secret", open UDP 1194

The three service instances 242, 244, and 246 begin passively observing all UDP packets that arrive at the host on port 53.

Figure 3:
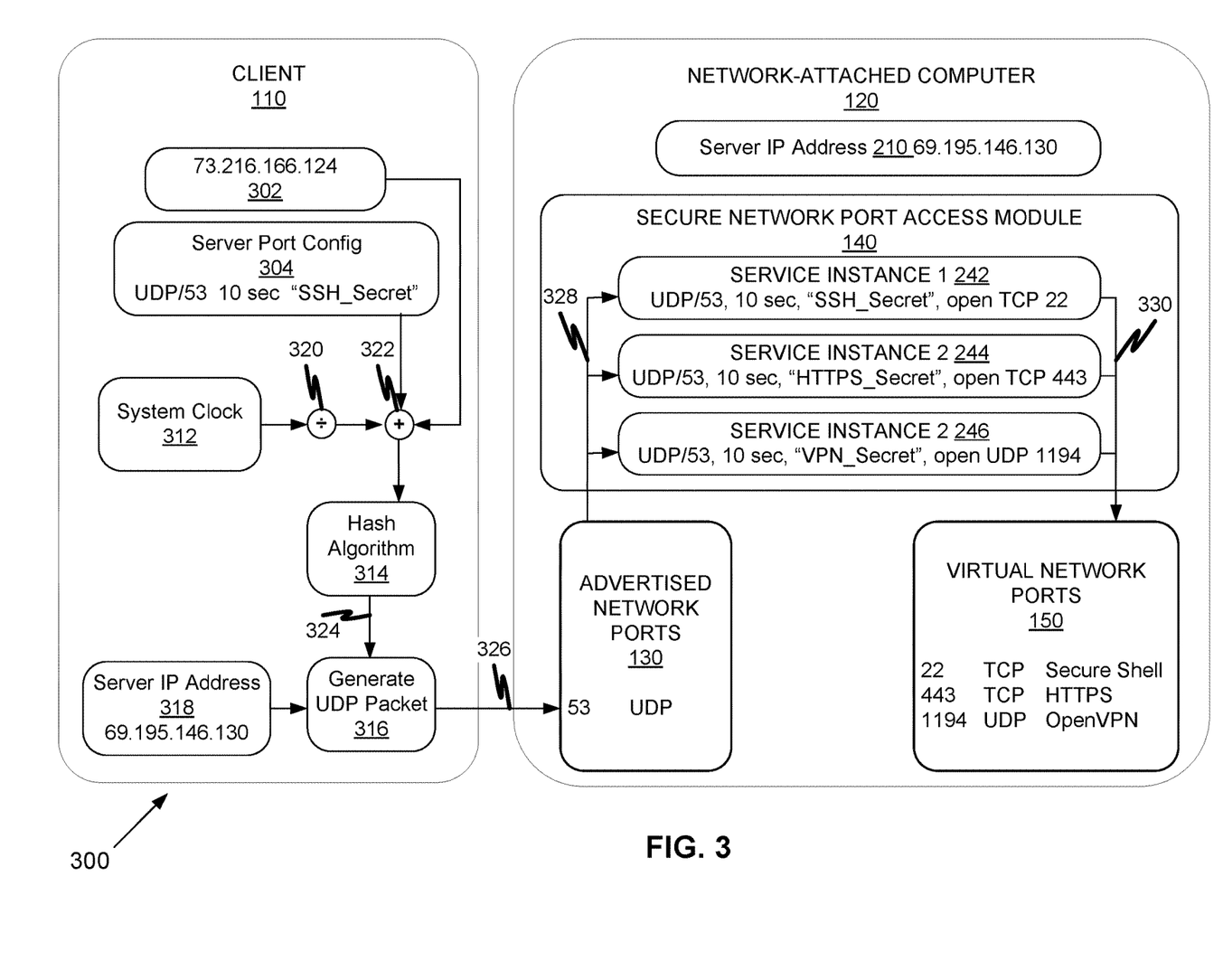
FIG. 3 depicts client-side operations in a system that provides zero-network profile cryptographically-secure network port access from a client to a server.

FIG. 3 depicts client-side operations in a system that provides zero-network profile cryptographically-secure network port access from a client to a network-attached computer. The client 110 with an IP address 302 of 73.216.166.124 wishes to establish a Secure Shell (SSH) connection to the network-attached computer 120. The system administrator has configured the client 110 at 304 to know that the network-attached computer 120 is waiting for cryptokens on UDP/53, is using a 10-second tolerance, and that the shared secret for cryptokens to open the SSH port is "SSH_Secret".

The client 110 queries a system clock 312 to determine a number of seconds that have elapsed since the Internet Time Epoch (Midnight, Jan. 1, 1970, GMT) and receives the value 1555002764. Because of a tolerance value of ten seconds (to account for minor discrepancies between the system clocks of different machines), at 320, the client 110 performs integer division by 10, arriving at the value 155500276 as the timecode for this cryptoken. At 322, the client 110 constructs a token string with the time code, the IP address 302, the shared secret from the server configuration 304, the port number of the network-attached computer 120 it wants to connect to from the server configuration 304, and that it wants to open that port:

155500276 73.216.166.124 SSH_Secret 22/tcp open.

The client 110 creates a cryptographically-strong hash digest of that string using a sufficient hashing algorithm 314, such as SHA256, which yields a cryptoken at 324:

4f8ffc48c9c0ef5769c3e1a17998dc0018200eb729c9b473-1a308a53b32f97c0

The client 110 generates a UDP packet comprising the cryptoken at 316 to the IP address 69.195.146.130 of the network-attached computer 120.

Figure 4:
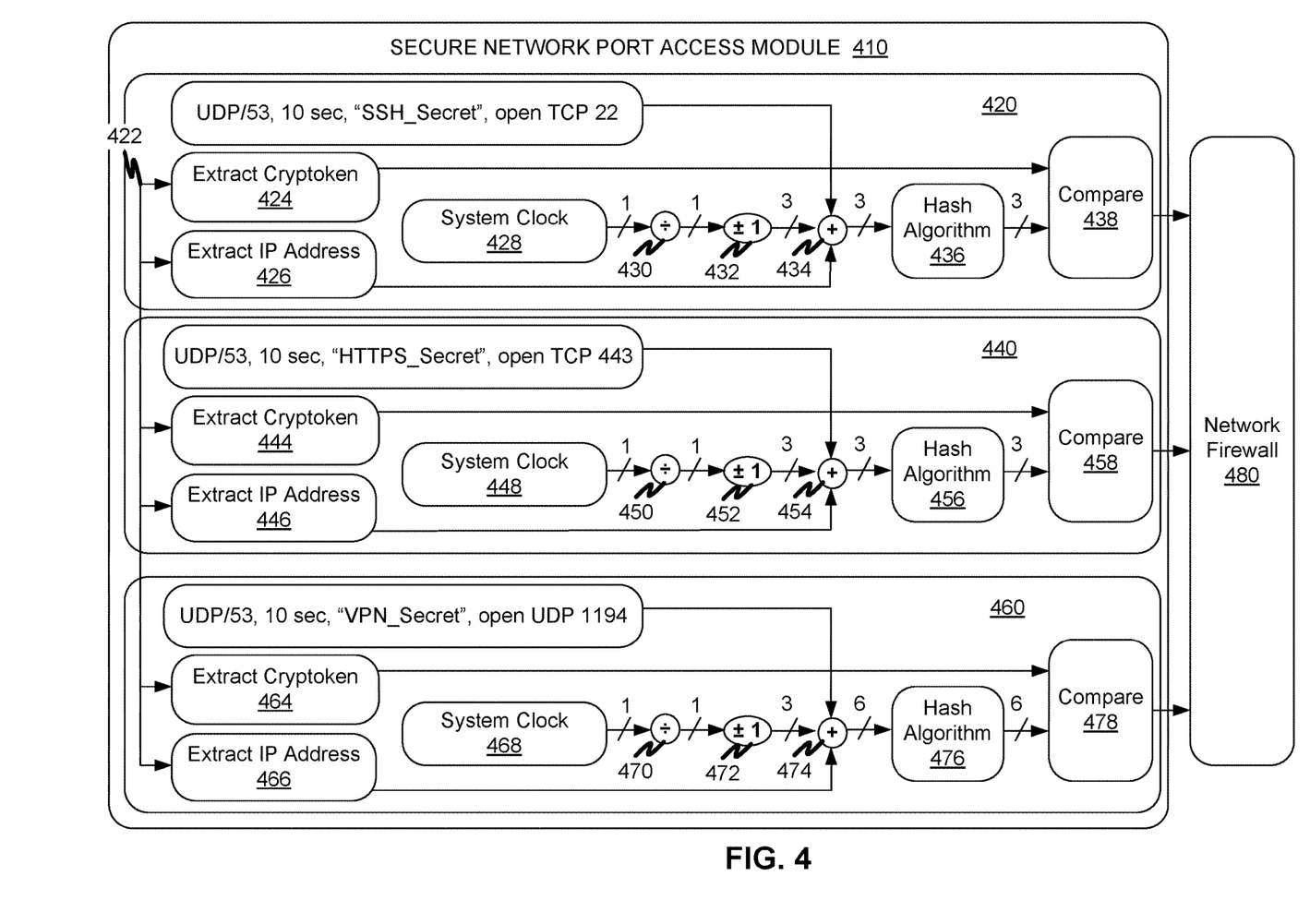
FIG. 4 depicts server-side operations in a system that provides zero-network profile cryptographically-secure network port access from a client to a server.

FIG. 4 depicts operations in a network attached computer that receives a UDP packet comprising a cryptoken. A secure network port access module 410 in a network attached computer, e.g., the network-attached computer 120, is running three instances of the service to protect virtual network ports. Each of the three service instances 420, 440, and 460 receive a UDP packet comprising the cryptoken at 422. Each of the three service instances 420, 440, and 460 extract the cryptoken at 424, 444, and 464, respectively. Upon extracting the cryptoken, each of the three service instances 420, 440, and 460 can determine if the cryptoken is a valid cryptoken, i.e., that the cryptoken has a correct length and that the cryptoken comprises hexadecimal characters. Each of the three service instances 420, 440, and 460, independent of one another, can perform the following steps:

1. At 426, 446, and 466, each instance can extract the IP address of the host that sent the packet (73.216.166.124) from the Internet Protocol (IP) packet header.
2. At 426, 446, and 466, each instance can query a system clock 428, 448, and 468 and receive a current seconds-since-epoch value, e.g., 1555002765.
3. At 430, 450, and 470, each instance can integer-divide the seconds-since-epoch value by a timing tolerance to generate a timecode, e.g., 155500276.
4. At 432, 452, and 472, each instance accounts for edge-case time interval discrepancies between the client and the network-attached computer by generating two additional timecodes, incremented and decremented by one, respectively, e.g., 155500275 and 155500277.
5. At 434, 454, and 474, each instance generates a token seed string for each of the three timecodes using the respective timecode, the IP address of the host that sent the packet, the shared secret, the port number of the network-attached computer, i.e., the network-attached computer 120, to which it corresponds, and that it wants to open that port.
6. At 474, the instance that is controlling port 1194/udp, because it must account for cryptokens used for closing the port as well as opening it, calculates three additional token seed strings (see below).
7. At 436, 456, and 476, each instance calculates a hash digest, e.g., using a hash algorithm such as SHA256, of each of the token seed strings.

The token seed strings for the three instances are as follows:

22/TCP:
  155500275 73.216.166.124 SSH_Secret 22/tcp open
  155500276 73.216.166.124 SSH_Secret 22/tcp open
  155500277 73.216.166.124 SSH_Secret 22/tcp open
443/TCP:
  155500275 73.216.166.124 HTTPS_Secret 443/tcp open
  155500276 73.216.166.124 HTTPS_Secret 443/tcp open
  155500277 73.216.166.124 HTTPS_Secret 443/tcp open
1194/UDP:
  155500275 73.216.166.124 VPN_Secret 1194/udp open
  155500276 73.216.166.124 VPN_Secret 1194/udp open
  155500277 73.216.166.124 VPN_Secret 1194/udp open
  155500275 73.216.166.124 VPN_Secret 1194/udp close
  155500276 73.216.166.124 VPN_Secret 1194/udp close
  155500277 73.216.166.124 VPN_Secret 1194/udp close After putting these seed strings through the hash algorithm 436, 456, and 476, the service instances 420, 440, and 460 have the following cryptokens:

22/TCP:
  3cb08b8f586d12369b9a6956530223da79dd297b591-1716e44d4367e53fd4219
  4f8ffc48c9c0ef5769c3e1a17998dc0018200eb729c9b-4731a308a53b32f97c0
  2b25cd01900e4c6761ccc891fa75754022be86bee597-9253a0fc3b75aded6cde
443/TCP:
  41d3398066eb83219c56771c5e05a938d9eeb2b6eb4-768f43a56b0d808174909
  185702f6308ab0fdc1ec83a1d51612354f20b0867593-243ed90680a4d9b42980
  088b3a5f7dda8ad1035be2b717e6b66cc55ae0a29c42-3bdd714cf216f4c550a6
1194/UDP:
  46daa9b53858329a3c9a3797c1400e08f60c1b08904c-a7df5557492cf4d24464
  9e074067419bf2faecfe62d0cdeea69cb4ed59213de6a-446f5ccea7f7a9bd734
  56e82b4e1b43f3a6de8d494b453daf61fbcc6f68050b7-d407a662a1a91bc5426
  be3f92251365c8f911dcc761d98fdb1947bfab2da24ce-b8dd7cef3e4662eb5a
  a8ffe3b74f1c9a0e32eeb4bee041c65f2c2fbf99159ce3-09e514be5176d5f78d
  a630b1481604a25a072dbabbe589fcde010b6ef2a9f0-326aa54de53c7303a29b The service instances 420, 440, and 460 each compare the cryptoken that they received in the packet from the client with the cryptokens that they computed for themselves at 438, 458, and 478, respectively. Only the instance 420 for 22/TCP finds a match, so the instance 420 establishes a rule in a network firewall 480 on the network-attached computer, e.g., the network-attached computer 120. The rule allows inbound TCP connections on port 22 only if they originate from the host with IP address 73.216.166.124. A predetermined number of seconds later, the instance 420 removes the rule, which has no effect on any connection that was established during the open period, but which no longer allows new inbound connections from 73.216.166.124. The instance 440 for 443/tcp and the instance 460 for 1194/udp find no matches between their calculated cryptokens and the received cryptoken, so they take no action.

Figure 5:
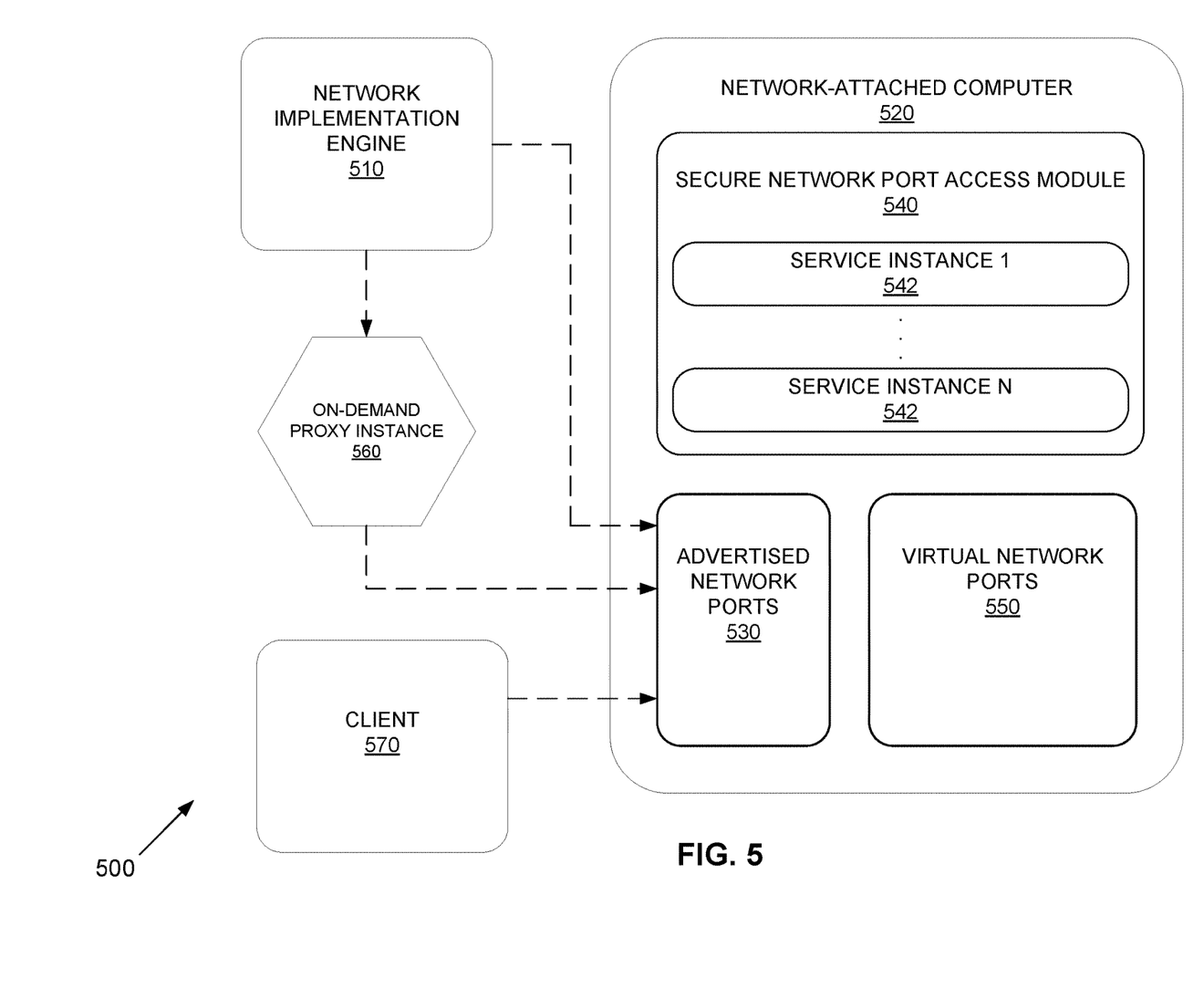
FIG. 5 depicts a system that provides zero-network profile cryptographically-secure network port access used in conjunction with an on-demand computing network environment.

FIG. 5 depicts a system 500 that provides zero-network profile cryptographically-secure network port access used in conjunction with an on-demand computing network environment comprising a network implementation engine, such as the network implementation engine in the on-demand computing network environment described in U.S. Pat. No. 9,935,850, the entirety of which is herein incorporated by reference. The system may also be used in conjunction with disposable network proxies, e.g., the disposable network proxies described in U.S. Provisional Application No. 62/813,271, the entirety of which is herein incorporated by reference. The system may also be used in conjunction with a virtual private network (VPN)/reconnaissance-resistant network (RRN) maximum transfer unit (MTU) cloaking device as described in U.S. Provisional Application No. 62/732,691, the entirety of which is herein incorporated by reference. The on-demand computing network environment can make use of a secure network port access module in at least two ways.

First, when a network implementation engine 510 communicates with a virtual machine deployed in the cloud, it can do so using the SSH protocol on 22/TCP, either by connecting directly from the network implementation engine 510 itself, or via an on-demand proxy instance 560. In the case of a direct connection, the network implementation engine 510 would act as the client 110 in the example from FIGS. 2-3, sending a cryptoken requesting that port 22/TCP on the specified deployed virtual machine be opened for the network implementation engine 510. In the case of an indirect connection via the on-demand proxy instance 560, the on-demand proxy instance 560 would act as the client 110 in the example from FIGS. 2-3, sending a cryptoken requesting that port 22/TCP on the specified deployed virtual machine be opened for the on-demand proxy instance 560 and then proxying commands from the network implementation engine 510 through the connection established between the on-demand proxy instance 560 and the specified deployed virtual machine.

Second, when a client 570 in an on-demand computing network environment, e.g. a desktop client, a mobile client, a network appliance which establishes connections between networks/devices and an RRN/VPN, or a VPN/RRN MTU cloaking device, establishes a connection to an entry point host, it can do so either on 1194/TCP (OpenVPN) or 10000/TCP (Secure Socket Funneling (SSF) tunnel). The client 570 establishes a connection to the entry point host in the cloud either via 10000/TCP or 1194/UDP. In the case of 10000/TCP, the client 570 can act as the client 110 in the example from FIGS. 2-3, requesting that port 10000/TCP on the entry pint host be opened for the client. In the case of 1194/UDP, the client 570 can act as the client 110 in the example from FIGS. 2-3 twice, sending a first cryptoken requesting that 1194/UDP be opened for the client, and then, when its VPN session is complete, sending a second cryptoken requesting that 1194/UDP be closed for the client 570.

Figure 6:
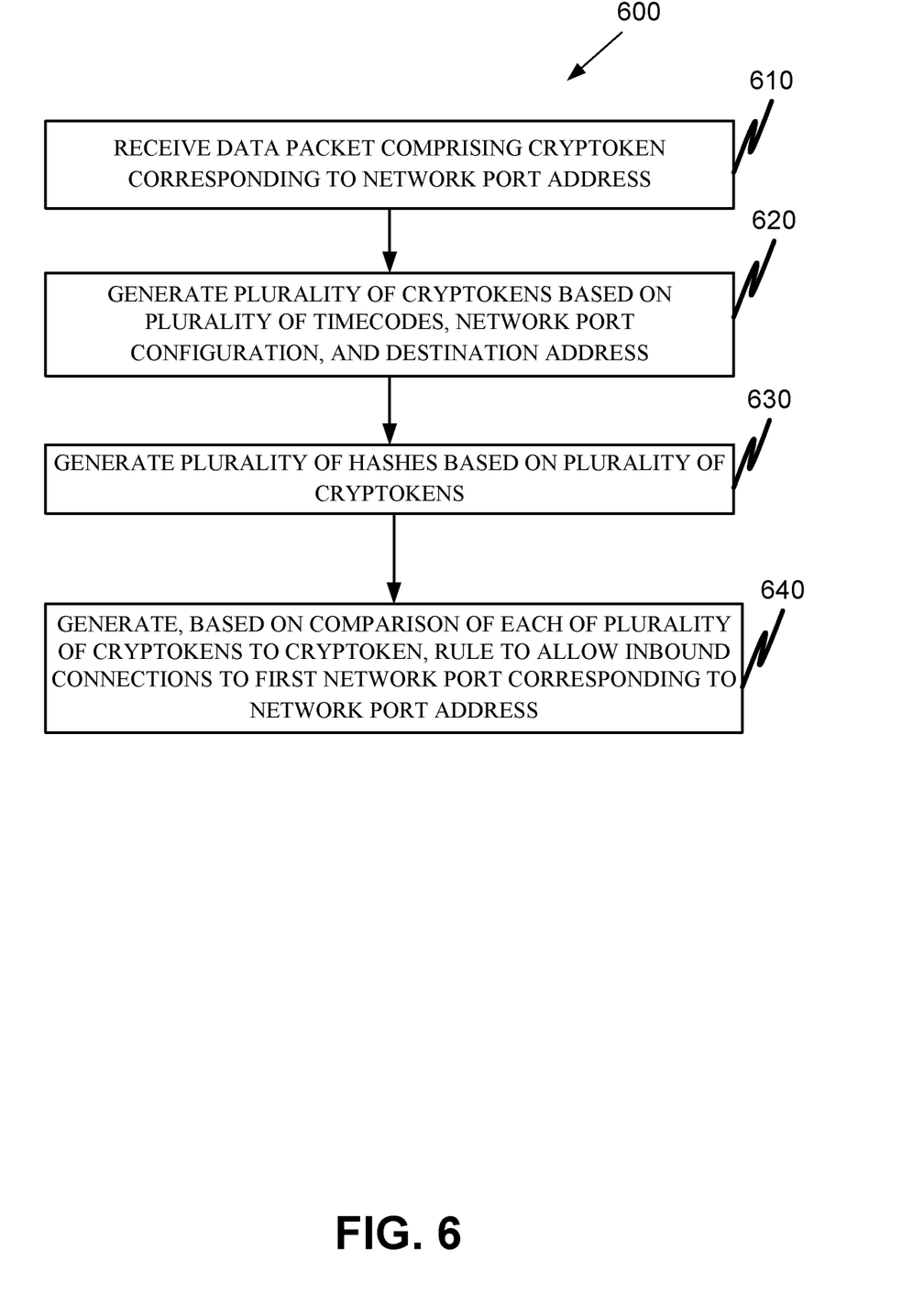
FIG. 6 depicts a flow diagram corresponding to a method for protecting access to network ports on a server.

FIG. 6 depicts a flow diagram corresponding to a method for protecting access to network ports on a server. At 610, the server receives a data packet comprising a cryptoken corresponding to a network port address. The server generates a plurality of cryptokens based on a plurality of timecodes, a network port configuration, and the destination address at 620. At 630, the server generates a plurality of hashes based on the plurality of cryptokens. The server generates, based on a comparison of each of the plurality of cryptokens to the cryptoken, a rule to allow inbound connections to a first network port corresponding to the network port address at 640.

Examples have been used to describe the invention herein, and the scope of the invention may include other examples.

It is claimed:

1. A system for protecting access to network ports on a server, the system comprising:
a server configured to:
receive, from a client, a data packet comprising a cryptoken corresponding to a network port address;
generate, by each of a plurality of running instances of a service to protect virtual network ports, a plurality of seed strings based on a plurality of timecodes, a network port configuration, and the destination address;
generate, by each of the running instances of the service to protect virtual network ports, a plurality of cryptokens by hashing the corresponding plurality of seed strings;
compare, by each of the running instances of the service to protect virtual network ports, the corresponding generated plurality of cryptokens to the cryptoken in the data packet to identify a match corresponding to a matching instance; and
generate, by the matching instance, a rule to allow inbound connections to a first network port for the matching instance corresponding to the network port address.

2. The system of claim 1, wherein the plurality of timecodes are based on a system time and a timing interval that accounts for discrepancies between the server and the client.

3. The system of claim 1, wherein the network port configuration further comprises a port number, a shared secret, and a predetermined period of time.

4. The system of claim 1, wherein the network port configuration further comprises a protocol, wherein a number of the plurality of generated cryptokens is based on the protocol.

5. The system of claim 1, wherein the server is further configured to:
receive the data packet at a second network port that is different from the first network port, wherein the first network port is not directly accessible by the client.

6. The system of claim 1, further comprising:
the client, the client being configured to generate the received cryptoken and the packet based on the received cryptoken and send the data packet to the server.

7. The system of claim 5, wherein the server is further configured to route traffic.

8. The system of claim 3, wherein the rule is further based on the shared secret and the predetermined period of time.

9. A method for protecting access to network ports on a server, the method comprising:
receiving, by the server from a client, a data packet comprising a cryptoken corresponding to a network port address;
generating, by each of a plurality of running instances of a service executed by the server to protect virtual network ports, a plurality of seed strings based on a plurality of timecodes, a network port configuration, and the destination address;
generating, by each of a plurality of running instances of a service executed by the server to protect virtual network ports, a plurality of cryptokens by hashing the plurality of seed strings;
comparing, by each of the running instances of the service executed by the server to protect virtual network ports, the corresponding generated plurality of cryptokens to the cryptoken in the data packet to identify a match corresponding to a matching instance; and
generating, by the matching instance, a rule to allow inbound connections to a first network port for the matching instance corresponding to the network port address.

10. The method of claim 9, wherein the plurality of timecodes are based on a system time and a timing interval that accounts for discrepancies between the server and the client.

11. The method of claim 9, wherein the network port configuration further comprises a port number, a shared secret, and a predetermined period of time.

12. The method of claim 9, wherein the network port configuration further comprises a protocol, wherein a number of the plurality of generated cryptokens is based on the protocol.

13. The method of claim 9, further comprising:
receiving, by the server, the data packet at a second network port that is different from the first network port, wherein the first network port is not directly accessible by the client.

14. The method of claim 9, further comprising:
generating, by the client, the received cryptoken and the packet based on the received cryptoken; and
sending the data packet to the server.

15. The method of claim 13, further comprising routing, by the server, traffic.

16. The method of claim 11, wherein the rule is further based on the shared secret and the predetermined period of time.

17. A non-transitory computer readable storage medium storing one or more programs configured to be executed by one or more data processors, the one or more programs comprising instructions protecting access to network ports on a server, the instructions comprising:
receiving, by a server from a client, a data packet comprising a cryptoken corresponding to a network port address;
generating, by each of a plurality of running instances of a service executed by the server to protect virtual network ports, a plurality of seed strings based on a plurality of timecodes, a network port configuration, and the destination address;
generating, by each of the running instances of the service executed by the server to protect virtual network ports, a plurality of cryptokens by hashing the corresponding plurality of seed strings;
comparing, by each of the running instances of the service executed by the server to protect virtual network ports, the corresponding generated plurality of cryptokens to the cryptoken in the data packet to identify a match corresponding to a matching instance; and
generating, by the matching instance, a rule to allow inbound connections to a first network port for the matching instance corresponding to the network port address.

18. The non-transitory computer readable storage medium of claim 17, wherein the plurality of timecodes are based on a system time and a timing interval that accounts for discrepancies between the server and the client.

19. The non-transitory computer readable storage medium of claim 17, wherein the network port configuration further comprises a port number, a shared secret, and a predetermined period of time.

20. The non-transitory computer readable storage medium of claim 17, wherein the network port configuration further comprises a protocol, wherein a number of the plurality of generated cryptokens is based on the protocol.

* * * * *